US005615935A

United States Patent [19]

Beyer et al.

[11] Patent Number: 5,615,935

[45] Date of Patent: Apr. 1, 1997

[54] ABS CONTROL FOR A FOUR WHEEL DRIVE VEHICLE EXPERIENCING AXLE OSCILLATIONS

[75] Inventors: Claus Beyer, West Bloomfield; John Gatza, Flint; Carlos Atoche, West Bloomfield; Sam Totonji, Novi, all of Mich.

[73] Assignee: Robert Bosch GmbH, Stuttgart, Germany

[21] Appl. No.: 531,930

[22] Filed: Sep. 21, 1995

[51] Int. Cl.[6] .................... B60T 8/66

[52] U.S. Cl. .................... 303/195; 303/143; 303/190; 303/194

[58] Field of Search .................... 303/143, 190, 303/166, 171, 173, 194, 195, DIG. 4

[56] References Cited

U.S. PATENT DOCUMENTS 5,193,889 3/1993 Schaefer .................... 303/195
5,342,118 8/1994 Kampfmann et al. .................... 303/195

FOREIGN PATENT DOCUMENTS 294803 12/1988 European Pat. Off. .................... 303/194
2181505 3/1988 United Kingdom .................... 303/190

*Primary Examiner*—Matthew C. Graham
*Attorney, Agent, or Firm*—Felfe & Lynch

[57] ABSTRACT

Under conditions which indicate all wheels are unstable, all have been in pressure decrease for a long time, and the vehicle reference velocity has been continuously negatively corrected for a long time, recovery are flags set on all wheels. If all recovery flags are set and four wheel drive axle oscillations are present and the reference velocity has not been in negative correction for too long, the gradient of the vehicle reference velocity is limited to a fixed lesser slope. If one or more recovery flags are set, other measures can be taken, including flattening of the vehicle reference velocity through gradual additions to the calculated vehicle acceleration, and giving longer pressure holds and delaying pressure increase. The recovery flag is reset separately on each wheel only when that specific wheel becomes completely stable. The presence of four wheel drive axle oscillations is determined based on the difference between the sum of the speeds of the front wheels and the sum of the speeds of the rear wheels. This difference is also filtered to determine whether or not the vehicle is in four wheel drive.

18 Claims, 5 Drawing Sheets

EVAL. CIRCUIT 12
FPG 14
16
$FPG_{ALL}$
wheel speed sensors
$V_{Ref}$ 10
48 SDV
$\dot{V}_{Ref}$ 28
44 AOL
axle oscillation
18
20 F1
21
Reset flags
<0 30
46
POR_Z 32
22 ABZ
24
26 $>ABZ_R$
$>N_R$ 34
$\leq N_L$ 36
40
38
42
Set flags
All recovery flags set
$RECV_{XX}$

ABS CONTROL FOR A FOUR WHEEL DRIVE VEHICLE EXPERIENCING AXLE OSCILLATIONS

BACKGROUND OF THE INVENTION

The invention relates to an antilock brake system for a vehicle having locked center four wheel drive (four wheel drive on demand). More particularly, the invention relates to a method for allowing the reference velocity to recover when the vehicle experiences four wheel drive axle oscillations. It also relates to methods for determining when the vehicle is in four wheel drive, and when such axle oscillations are present.

Automatic control of brake pressure in an ABS depends on accurate determination of the vehicle reference velocity, which is compared with the wheel speeds in order to determine slippage at the individual wheels. Since the wheel speeds provide important inputs for calculating the reference velocity, problems with reference stability arise after a negative μ-jump (transition to road surface having a lower coefficient of friction) and on very low μ surfaces in general.

In vehicles having a locked center (part time) four wheel drive (4WD) mode, the sums of the wheel velocities of the front wheels equals the sums of the wheel velocities at the rear wheels. This is because the front and rear axles are connected without any differential. When braking wheels independently, as ABS does, this may create an inequality between the front and rear axle speeds, causing wind-up in the drive train, i.e. torsional loading of the prop shafts, axles, CV joints, etc. When the brakes are released, unwinding may occur, causing "swinging" of the wheel speeds. If this wind-up and swinging are not prevented through strategic braking (or not braking), 4WD axle oscillations can arise. This problem does not arise in full time 4WD vehicles, because there is some type of differential between the front and rear axles; this allows the front and rear axles to turn at different speeds.

Particularly in the 4WD mode, vehicle reference velocity can be "lost" within 2–5 seconds after a negative μ-jump in spite of the input from an acceleration sensor. This is caused by late response of the acceleration sensor, the reluctance to use this sensor to its fullest extent (for safety reasons), and four wheel drive axle oscillations which are present in a locked-center 4WD vehicle. These axle oscillations cause the wheel speed sensors to see high wheel re-accelerations, which in turn disable prior mechanisms which support or flatten the reference velocity.

The prior art does not address the problem of recovering the reference velocity in a 4WD drive vehicle experiencing axle oscillations. U.S. Pat. No. 5,364,174 describes an ABS for a 4WD vehicle and particularly relates to supporting the reference speed by use of an auxiliary reference speed when one or more wheels becomes unstable. Problems due to wheel or axle oscillations which could interfere with the wheel speed signals are not recognized.

The prior art also does not address the problem of 4WD axle oscillations which arise in a vehicle having locked center 4WD. U.S. Pat. No. 4,317,105 discloses using an accelerometer on the suspension in order to detect wheel oscillations, which in turn indicate the condition of the shock absorbers.

U.S. Pat. No. 4,511,014 discloses a system for automatically switching from 2WD to 4WD, and recognizes 4WD problems including vibration of the vehicle body. There is no recognition of interference with the sensed wheel speeds.

SUMMARY OF THE INVENTION

Under conditions which are experienced with a locked center 4WD vehicle on high to low μ transitions and low μ with severe axle oscillations in general, recovery flags on all four wheels are set. These conditions are: (1) all wheels unstable ($\overline{FPG}$); (2) sum of time in pressure decrease counters for all wheels (ABZ) greater than a threshold; and (3) continuous negative correction of reference for a length of time exceeding a threshold ($POR\_Z>N_R$). These conditions indicate that the vehicle reference velocity is dropping off too fast and corrective measures must be taken to prevent this to maintain vehicle stability/steerability, insofar as a much higher level of true slip at wheels is generated if the reference has dropped too fast.

The recovery flags, although set simultaneously, are reset separately. The reset condition is simply that the particular wheel must be completely stable.

Once the recovery flags have been set, they are used to save the vehicle reference velocity in a few different ways. The most significant of these reference correction measures is the actual limitation of the calculated vehicle deceleration (SDV). If all recovery flags are set, 4WD axle oscillation (AOL) has been detected, and the reference in negative correction counter does not exceed a threshold $N_L$, then the calculated vehicle deceleration SDV is limited to a slope no steeper than a predetermined slope (e.g. −0.3 g) until these conditions are no longer satisfied. The SDV is used in the calculation of the vehicle reference velocity and therefore significantly influences the reference slope.

The measures dependent on the recovery flag which are of lesser significance but also aid in reference recovery are the adjustment of SDV and the delaying of the pressure increase pulsetrain. Adjustment of SDV is simply by the addition of a value dependent on the time in pressure decrease counters, ABZ. This is a reference velocity flattening measure which is undertaken when the recovery flag is set on a wheel. The delaying of the pressure increase pulsetrain can also be undertaken when the recovery flag is set on that wheel. By delaying the pulsetrain, wheels may recover to a greater degree, thus giving the reference velocity more stable wheels to follow.

With all the measures discussed, the vehicle reference velocity has a much better chance of surviving high to low μ transitions and very low μ as well in vehicles with locked center 4WD where severe axle oscillations are present. The wheels can thus maintain a slip level that will provide a much improved vehicle stability and steerability. This concept or similar (with different triggering conditions) will also work for certain 2WD vehicles with very high tire/wheel inertia and/or excessive drive train drag where wheels remain at high slip levels for a significant amount of time.

The invention also relates to a method for determining whether a locked center four wheel drive vehicle is in 2WD or 4WD. This determination is based on the fact that the sum of the front wheel speeds will equal the sum of the rear wheel speeds when the vehicle is in 4WD. The difference between these sums is taken, but the difference must be filtered to account for gear backlash, drive line elasticity, and tone wheel ringing. After calculating the raw value of this difference, the rate of change of this value per 10 ms control cycle, the filtered value, and its absolute value, the absolute filtered value is compared to a threshold to determine which drive mode (2WD or 4WD) the vehicle is operating in.

The unfiltered difference $\Delta V_{UNF}$ between the sums of the front wheel speeds and the sums of the rear wheel speeds can be monitored and ultimately (based on the corresponding frequency) can give an indication of whether 4WD axle oscillations AOL are present. Of course, axle oscillation detection is only enabled when it has been determined that the vehicle is not operating in 2WD mode.

Presence of four wheel drive axle oscillations is determined by setting a P flag when the difference $\Delta V_{UNF}$ exceeds a positive threshold and by setting an N flag when the difference falls below a negative threshold. $\Delta V_{UNF}$ is a signed value which generally fluctuates between these thresholds.

The axle oscillation flag (AOL) is set on the rising edge of either the positive or negative flag while at the same time a counter value is less than a threshold which corresponds to the typical axle oscillation frequency (10 Hz). The AOL flag is reset if the counter ever reaches its maximum value. The counter is incremented each 10 ms up to its maximum and is cleared on the very next rising edge of either the positive (P) or negative (N) flag. An axle oscillation is indicated by the AOL flag being set.

DETAILED DESCRIPTION OF THE PREFERRED EMBODIMENT

The reference velocity recovery logic makes use of existing counters and flags which are part of prior ABS logic. These counters and flags are as follows:

- POR_Z: Counter which indicates how long the reference velocity has been in continuous negative correction.
- ABZ: Counter which measures how long a wheel has been in pressure decrease.
- FPG: Flag which indicates if a wheel is stable or not ( $\overline{FPG}$=not stable)
- F1: Flag which indicates the beginning of instability at a wheel. F1 is set during the first 10 ms of pressure decrease on a wheel; there is not necessarily a genuine instability unless conditions exist for more than 10 ms.

Figure 1:
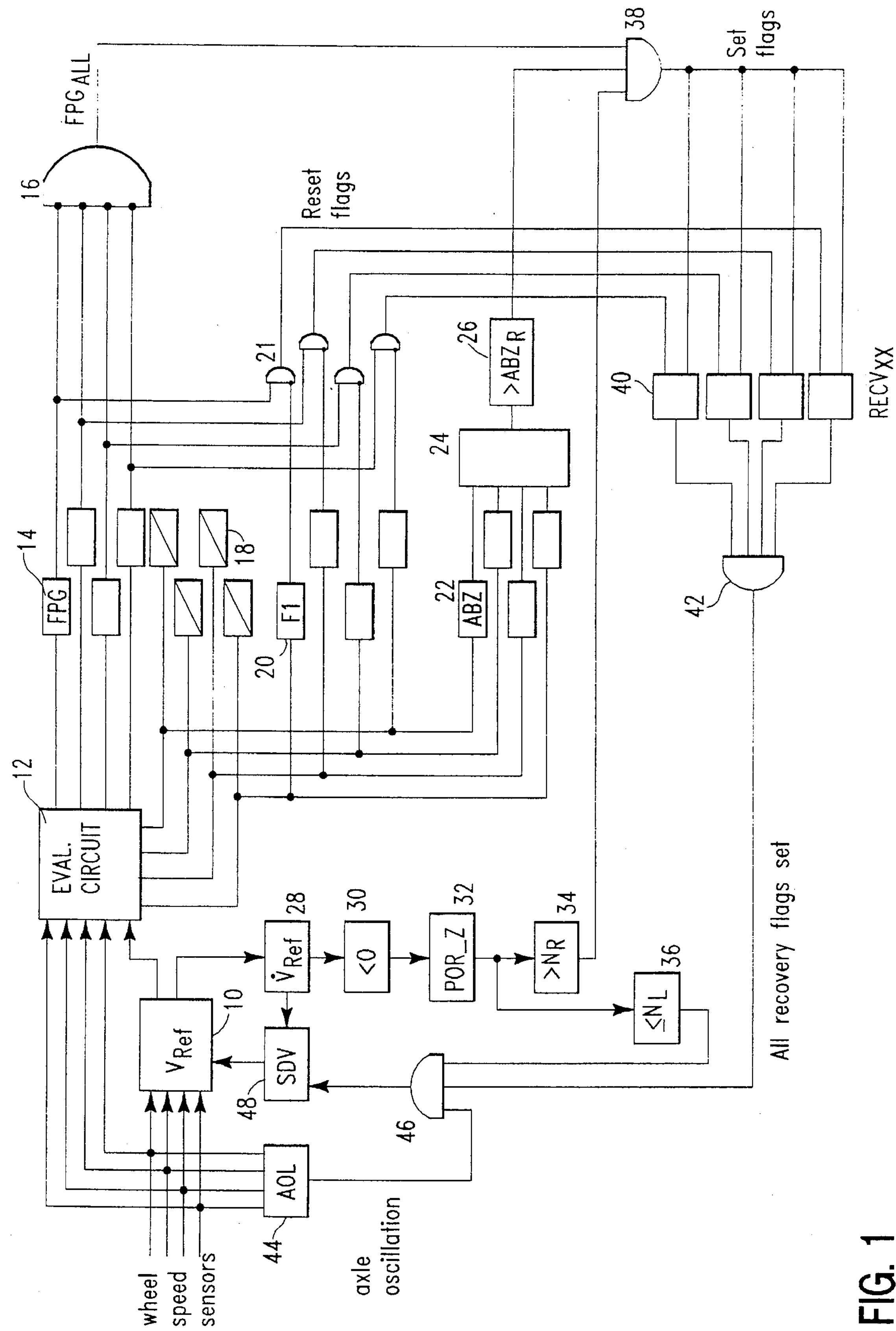
FIG. 1 is a schematic of the logic used to stabilize the reference velocity in the presence of 4WD axle oscillations.

Referring to FIG. 1, wheel speed signals are provided to a block 10 which calculates the vehicle reference speed $V_{REF}$ in known fashion. $V_{REF}$ is supplied to an evaluation circuit 12, which also receives the wheel speed signals in order to calculate slippage and generate brake pressure control signals for the valves 18 for each individual wheel or braking channel. These are 3/3 valves or the like which can be used to decrease, maintain, or increase the hydraulic pressure in accordance with the amperage and duration of the signals.

While the block 10 for calculation of $V_{REF}$ is shown separately from the evaluation circuit, this function is generally part of the evaluation circuit. It is shown this way solely to clarify how the value $V_{REF}$ is stabilized according to the method of the invention.

The evaluation circuit 12 determines whether or not the individual wheels are stable, and transmits signals which set (or reset) the FPG flags 14. This determination is made by known methods e.g. by comparing it to a threshold as described in U.S. Pat. No. 5,249,852. When none of the wheels are stable, as determined by absence of any FPG inputs to an AND-gate 18, a signal $\overline{FPG}_{ALL}$ is generated.

When pressure decrease at a wheel commences, as indicated by a signal to a valve 18, the corresponding counter 22 begins incrementing (once each cycle in a non-linear manner) and these individual wheel counter values ABZ are added in a block 24 at the conclusion of every controller cycle. This sum is compared with a threshold $ABZ_R$ (e.g. 120) in block 26, and a signal is transmitted when this threshold is exceeded.

As a third condition to setting the recovery flags, the time of continuous decrease of $V_{REF}$ is monitored. This may be done by differentiating the $V_{REF}$ signal from block 10 in a differentiator 28 to produce the reference gradient $\dot{V}_{REF}$. When this is negative, as indicated by block 30, a counter 32 begins to increment and continues to increment as long as a $\dot{V}_{REF}$ is negative. When the time POR_Z exceeds a threshold $N_R$ (200 ms) as determined in a comparator 34, a signal is transmitted.

When signals $\overline{FPG}_{ALL}$, $\Sigma ABZ>ABZ_R$, and $POR\_Z>N_R$ are all present, as determined by AND gate 38, the recovery flags RECV (blocks 40) are set simultaneously, and signals are transmitted to an AND-gate 42 which transmits a further signal indicating that all four recovery flags are set.

Resetting of the recovery flags is performed individually when the corresponding wheel becomes stable. Stability at a wheel is indicated by setting of a corresponding FPG flag at block 14 and further by the absence of any pressure decrease at that wheel. Flags F1 are set during the first 10 ms of pressure decrease at a wheel; if the F1 flag is not set and the corresponding FPG flag is set, the corresponding AND gate 21 transmits a signal to block 40 to reset the corresponding recovery flag RECV. This will cancel the signal from AND gate 42 so that corrective action to recover the reference velocity will no longer be taken.

Setting of all recovery flags is only one of three conditions which triggers correction of $V_{REF}$; additionally the time of continuous decrease of $V_{REF}$ must not exceed a threshold $N_L$and 4WD axle oscillations (AOL) must be present. The second condition is determined by comparing the counter value POR_Z from block 32 with a threshold $N_L$ in block 36 and transmitting a signal while $N_L$ (e.g. 600 ms) is not exceeded. Presence of 4WD axle oscillations AOL is indicated by a signal from block 44. Block 44 is a schematic representation of circuitry which uses the wheel speeds to determine whether the vehicle is in 4WD and whether vibrations of a frequency which characterizes 4WD axle oscillations are present. This circuitry will be discussed in conjunction with FIGS. 4–6.

When all four recovery flags are set and $V_{REF}$ has not been decreasing for too long and 4WD axle oscillations are present, AND gate 46 transmits a signal to a block 48 which limits the calculated vehicle deceleration SDV. The block 48 receives the reference gradient $\dot{V}_{REF}$ from block 28 and limits this gradient to a predetermined value, e.g. −0.3 g. The value SDV is then imposed on the calculation of $V_{REF}$ in block 10 so that $V_{REF}$ will not decrease too quickly, and the reference value will not be "lost".

Figure 3:
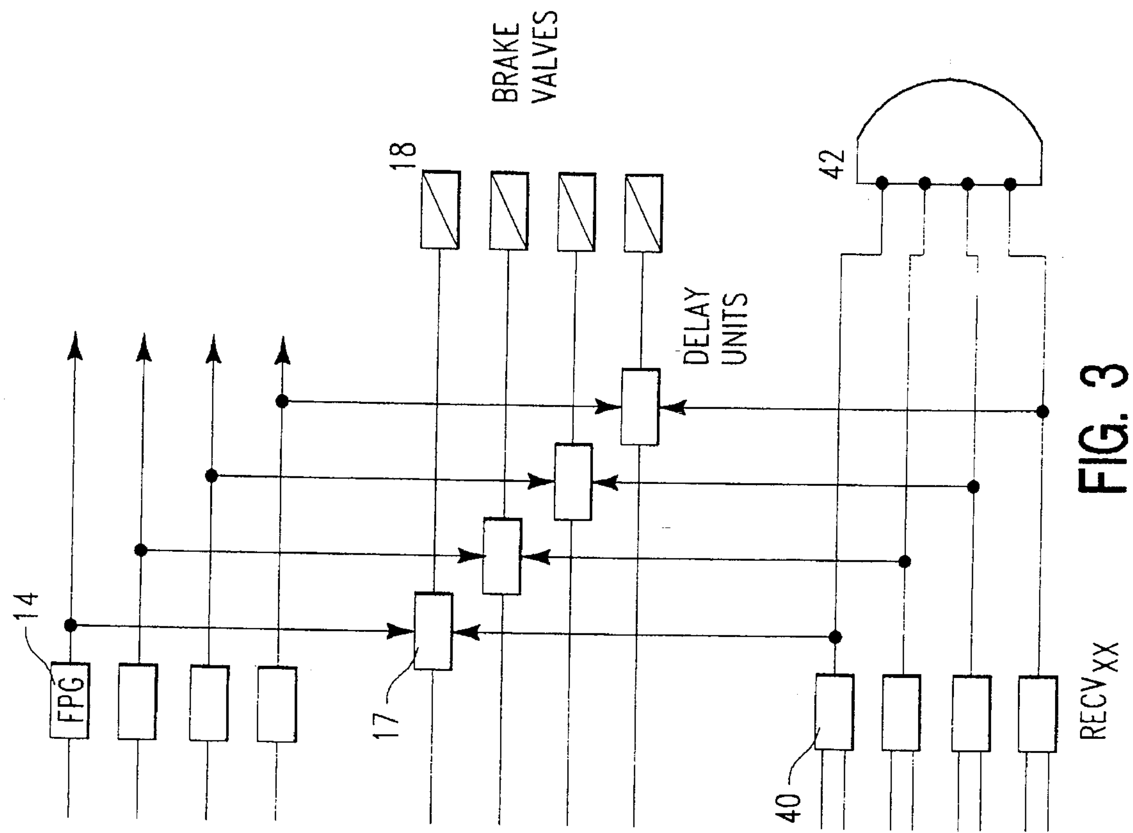
FIG. 3 is a schematic of additional logic for FIG. 1 to delay the pressure increase pulse train based on setting of recovery flags and instability at the wheels.
Figure 2:
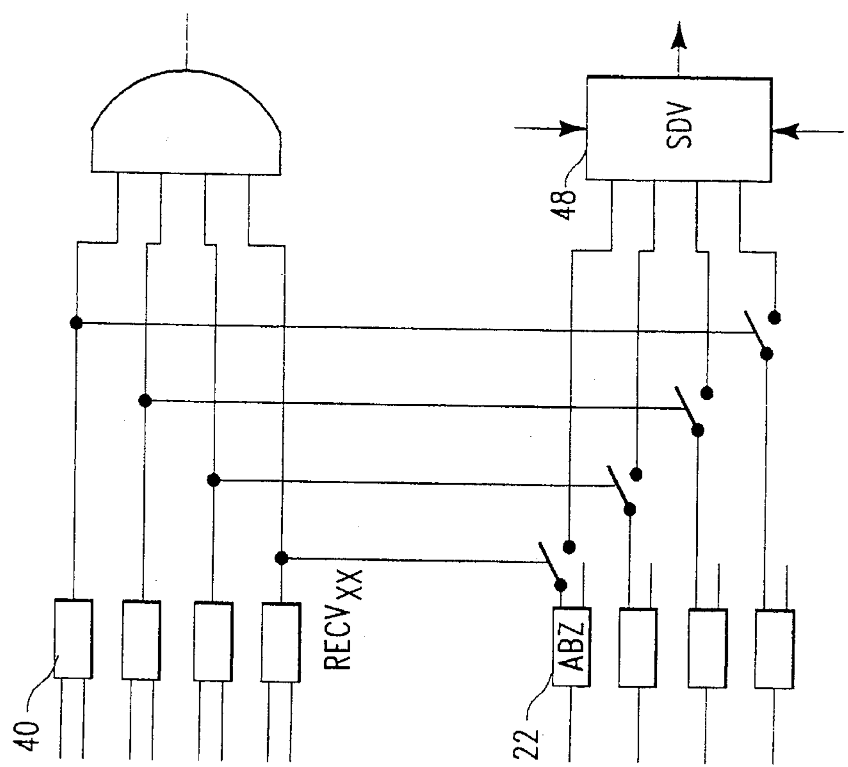
FIG. 2 is a schematic of additional logic for FIG. 1 to adjust the calculated vehicle deceleration based on the time in the pressure decrease counters.

FIGS. 2 and 3 depict additional measures which aid the recovery of the reference velocity. According to FIG. 2, the SDV block 48 receives inputs from the pressure decrease counters 22 when the corresponding recovery flags 40 are set. The reference velocity $V_{REF}$ is then flattened by lowering SDV (magnetic-wise) in dependence on the ABZ values received from the pressure decrease counters 22.

FIG. 3 shows a measure for stabilizing the reference velocity indirectly by stabilizing the wheels. When the recovery flags RECV are set as indicated by signals from blocks 40, delay units 17 will delay the pressure increase pulse train to corresponding brake valves 18 so that they will have additional time to recover from a slipping condition. In order for these delays to take effect it is also necessary for the corresponding wheels to be stable, as indicated by the FPG flags. FPG flags are set based on wheel stability and limited slippage, in addition to the absence of pressure decrease.

Figure 4:
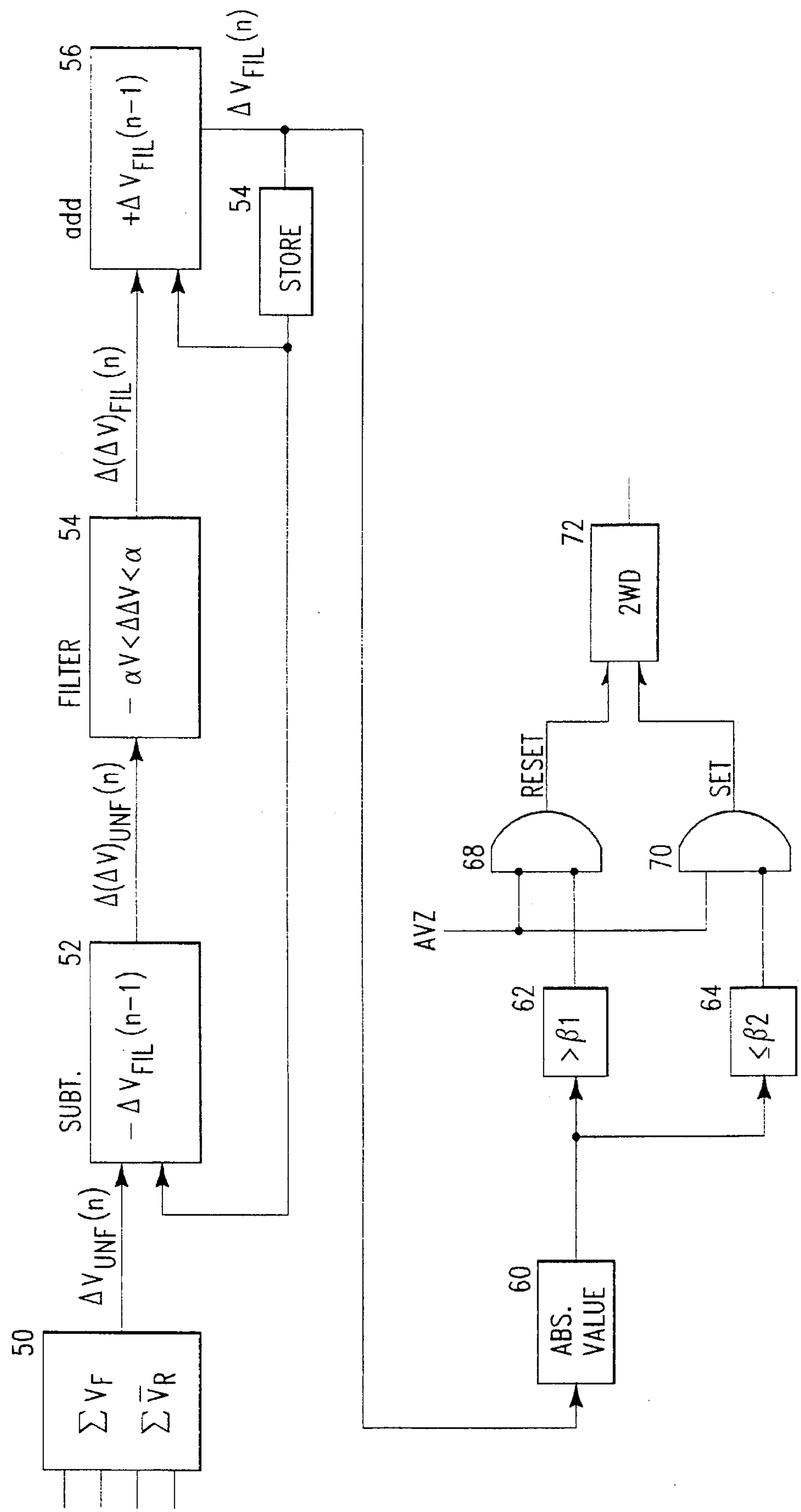
FIG. 4 is a schematic of the logic used to determine whether or not the vehicle is in 4WD based on the wheel speeds.

FIG. 4 is a logic diagram for determining whether the vehicle is in the 4WD mode or the 2WD mode, which is ultimately indicated by setting a 2WD flag 72.

Block 50 receives the wheel speed signals from the sensors, forms the sum $\Sigma V_F$ of the wheel speeds at the front axle and the sum $\Sigma V_R$ of the wheel speeds at the rear axle, and subtracts one from the other to produce an unfiltered difference $\Delta V_{UNF}(n)$, where n indicates the controller cycle; the procedure is repeated in cycles n, n+1, . . . having a duration of about 10 ms each. Prior to filtering, the filtered difference $\Delta V_{FIL}(n-1)$ from the previous cycle is subtracted from $\Delta V_{UNF}(n)$ to produce the change $\Delta(\Delta V)_{UNF}(n)$ per control cycle (block 52). The change per cycle is then filtered to produce a filtered value $\Delta(\Delta V)_{FIL}(n)$ which falls between limits $-\alpha$ and $+\alpha$, where $\alpha$ is a vehicle dependent parameter, e.g., 0.5 km/h/10 ms (block 54). If $\Delta(\Delta V)_{UNF}(n)$ is less than $-\alpha$, $\Delta(\Delta V)_{FIL}(n)$ is limited to $-\alpha$. For values between $-\alpha$ and $+\alpha$, $\Delta(\Delta V)_{FIL}(n)=\Delta(\Delta V)_{UNF}(n)$. For values exceeding $\alpha$, $\Delta(\Delta V)_{FIL}(n)$ is limited to $\alpha$. The filtered change per cycle $\Delta(\Delta V)_{FIL}(n)$ is then added to the filtered difference $\Delta V_{FIL}(n-1)$ from the previous cycle to produce the filtered difference $\Delta_{VIL}(n)$ (block 56). This is stored for one cycle in a store 58 in order to provide the value $\Delta V_{FIL}(n-1)$ needed for calculating $\Delta V_{FIL}(n)$ in the next cycle.

The absolute value of the filtered difference $\Delta V_{FIL}(n)$ is determined in block 60 and compared with a reset threshold $\beta$1 in a block 62 and a set threshold $\beta$2 in a block 64. If the ABS is active, as indicated by a signal AVZ from the evaluation circuit, and if $|\Delta_{FIL}(n)|$ exceeds the set threshold $\beta$2 of about 7 km/h, then AND gate 70 transmits a signal which sets the 2WD flag at block 72. If the ABS is not active and $|\Delta V_{FIL}(n)|$ is less than or equal to a reset threshold $\beta$1 of about 1 km/h, the 2WD flag is reset (2WD). This provides an indication that the vehicle is in the 4WD mode. $\beta$1 and $\beta$2 are vehicle dependent parameters.

Figure 5:
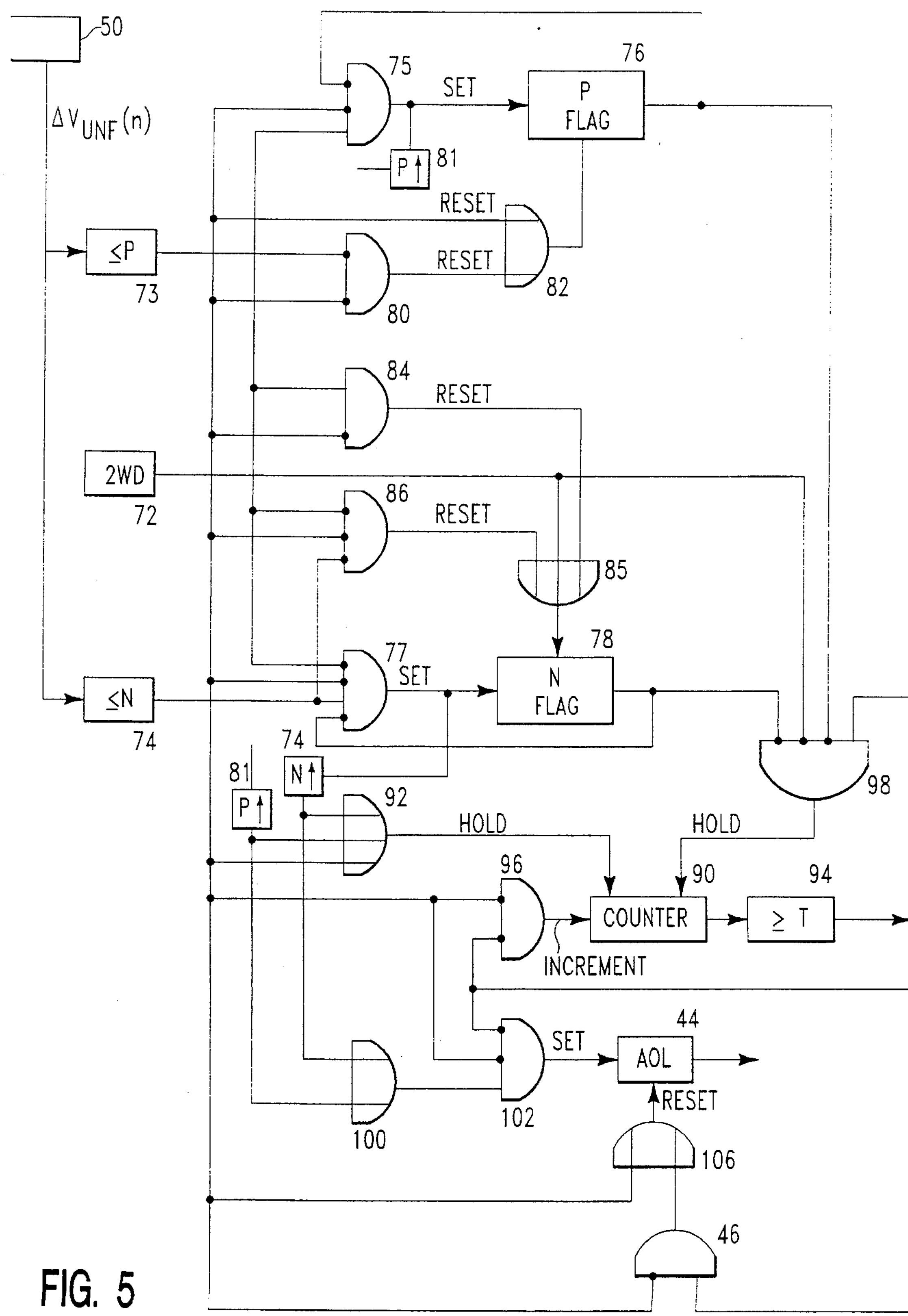
FIG. 5 is a schematic of the additional logic for FIG. 4 to determine whether or not 4WD axle oscillations are present.
Figure 6:
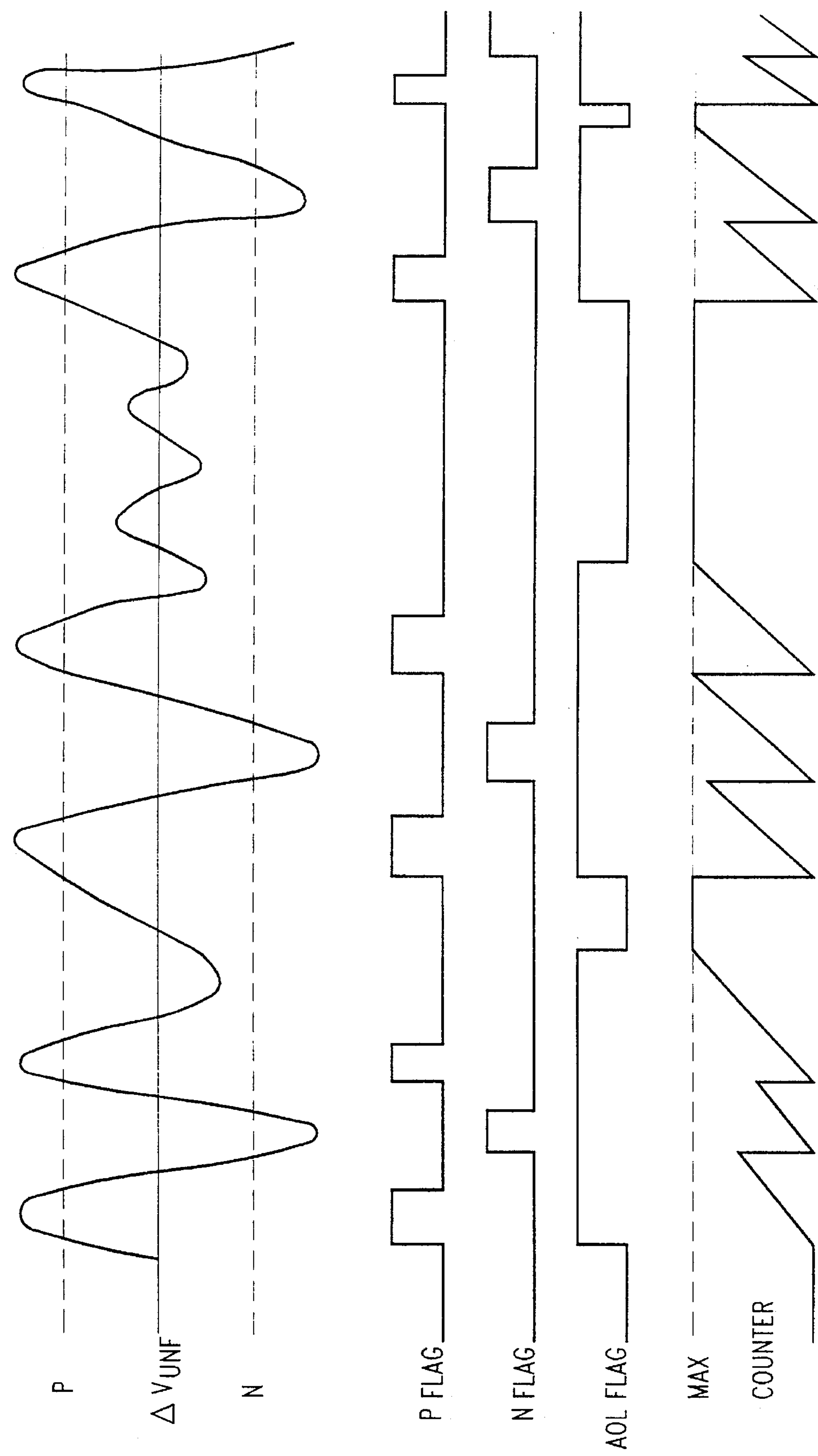
FIG. 6 is a plot of the difference in wheel speeds at the axles, and the states of the flags and the counter.

FIG. 5 illustrates the logic for determining whether 4WD drive axle oscillations are present, which proceeds by monitoring of the unfiltered difference $\Delta V_{UNF}(n)$ to determine the oscillation period. FIG. 6 is a plot which shows the dependence of various flags on the value of $\Delta V_{UNF}(n)$.

Each time $\Delta V_{UNF}(n)$ exceeds a positive threshold P (block 73) or falls below a negative threshold N (block 74), a corresponding flag is dynamically set (blocks 76 and 78). The setting of these flags further depends on the vehicle being in 4WD and the corresponding flag not already being set, as determined by respective AND-gates 75 and 77. Setting of the N flag further requires that threshold P not be exceeded. The P flag is reset if 2WD is indicated (OR-gate 82) or the P threshold is not exceeded while the vehicle is in 4WD (output of AND-gate 80 to OR-gate 82). The N flag is reset if threshold P is exceeded while the vehicle is in 4WD (AND gate 84) or threshold P is not exceeded and $\Delta V_{UNF}(n)$ is not below threshold N while the vehicle is in 4WD (AND gate 86).

The detection of 4WD axle oscillations is directly dependent on the states of the P flag 76, the N flag 78, the AOL flag 44, and the counter 90, and indirectly dependent on the value of $\Delta V_{UNF}(n)$.

The counter 90 is used to measure the period of axle oscillation, and is incremented once each 10 ms controller cycle beginning with the setting of the P flag or the N flag, and being reset (restarting at zero) with each new rising edge (dynamic setting) of a P flag or N flag. The setting of the 2WD flag provides an additional condition for resetting the counter via OR-gate 92. The counter continues to increment until it reaches a maximum value T (comparator 94). So long as it does not reach this maximum and the vehicle is in 4WD, it will continue to increment (AND gate 96). Once it reaches the maximum T, it will hold that value so long as the P and N flags are not set and the vehicle is in the 4WD mode (AND gate block 98).

The AOL flag is set on the occurrence of the dynamic setting of the P flag or N flag as indicated by the output of rising edge indicators 81 and 83 to OR-gate 100. Additionally, the counter must be below its maximum T and the vehicle must be in 4WD (AND-gate 102). The AOL flag is reset if the counter reaches its maximum while the vehicle is in 4WD (AND gate 104) or the vehicle is in 2WD (OR-gate 106).

The foregoing is exemplary and not intended to limit the scope of the claims which follow.

What is claimed is:

1. Method for controlling slippage of wheels during braking of a vehicle equipped with four wheels and an antilock brake system effective at all four wheels, said method comprising measuring the wheel speeds, calculating a vehicle reference velocity $V_{Ref}$ based on the wheel speeds, determining the gradient of $V_{Ref}$, determining if the gradient of $V_{REF}$ is negative, measuring the time POR_Z that the gradient has been negative, determining when the time POR_Z exceeds a threshold $N_R$, determining presence of instability at each wheel based on said wheel speeds and $V_{Ref}$, measuring the time ABZ that pressure has been decreasing at each wheel, adding the times of pressure decrease at all four wheels to produce a sum of pressure decrease times, determining when said sum exceeds a threshold time $ABZ_R$, setting a recovery flag for each wheel when the time POR_Z exceeds said threshold time $N_R$ and all four wheels are unstable and the sum of pressure decrease times exceeds said threshold time $ABZ_R$, limiting the reference velocity so that the negative gradient thereof is reduced when all four recovery flags are set, generating brake pressure control signals based on said wheel speed signals and said reference velocity, and varying brake pressure at each wheel in accordance with respective said control signals.

2. Method as in claim 1 further comprising, as an additional condition to limiting the reference velocity, determining that the time POR_Z does not exceed a threshold $N_L$.

3. Method as in claim 1 wherein said method is directed to a vehicle having locked center four wheel drive, said method further comprising, as an additional condition to limiting the reference velocity, determining that four wheel drive axle oscillations are present.

4. Method as in claim 1 wherein said reference velocity is limited by generating a calculated vehicle deceleration SDV based on the gradient of $V_{Ref}$, and imposing said calculated vehicle deceleration SDV on said reference velocity $V_{Ref}$.

5. Method as in claim 4 wherein said calculated vehicle deceleration SDV is limited to a predetermined maximum slope.

6. Method as in claim 4 wherein said calculated vehicle deceleration SDV is decreased magnitude-wise based on pressure decrease times ABZ at each wheel.

7. Method as in claim 1 wherein said brake pressure is varied by decreasing pressure followed by increasing pressure at respective wheels, said increasing being delayed based on setting of recovery flags at respective wheels.

8. Method as in claim 7 wherein said increasing of brake pressure is further based on absence of instability at respective wheels.

9. Method as in claim 1 further comprising resetting said recovery flags when respective wheels are no longer unstable.

10. Method for controlling slippage of wheels in a part time four wheel drive vehicle having a front axle, a rear axle, and a lockable center between axles, said vehicle being equipped with ABS, said method being performed in control cycles comprising measuring the wheel speeds, adding the wheel speeds at the front and rear axles to produce respective sums, subtracting the sum of the wheel speeds at the rear axle from the sum of wheel speeds at the front axle to produce an unfiltered difference $\Delta V_{UNF}(n)$ in a current control cycle n, retrieving a filtered difference $\Delta V_{FIL}(n-1)$ for the previous control cycle from storage, determining an unfiltered change of difference per control cycle $\Delta(\Delta V)_{UNF}(n)=\Delta V_{UNF}(n)-\Delta V_{FIL}(n-1)$, filtering said unfiltered change of difference $\Delta(\Delta V)_{UNF}(n)$ to produce a filtered difference $\Delta(\Delta V)_{FIL}(n)$, wherein $\Delta(\Delta V)_{FIL}(n)=-\alpha$ for $\Delta(\Delta V)_{UNF}(n)<-\alpha$, $\Delta(\Delta V)_{FIL}(n)=\Delta(\Delta V)_{UNF}(n)$ for $-\alpha<\Delta(\Delta V)_{UNF}(n)<\alpha$, and $\Delta(\Delta V)_{FIL}(n)=\alpha$ for $\Delta(\Delta V)_{UNF}(n)>\alpha$, where $\alpha$ is a vehicle dependent parameter, adding said filtered change of difference $\Delta(\Delta V)_{FIL}(n)$ to said filtered difference $\Delta V_{FIL}(n-1)$ to produce a filtered difference $\Delta V_{FIL}(n)$, storing said filtered difference $\Delta V_{FIL}(n)$ to provide $\Delta V_{FIL}(n-1)$ in the next control cycle, determining an absolute value $\Delta V_{FIL}(n)$ of said filtered difference $\Delta V_{FIL}(n)$, determining that said center is locked, whereby said vehicle is in four wheel drive, when said ABS is not active and said absolute value $|\Delta V_{FIL}(n)|$ is not greater than a first threshold $\beta 1$, generating brake pressure control signals based on whether or not said vehicle is in four wheel drive, and varying brake pressure at each wheel in accordance with said brake pressure control signals.

11. Method as in claim 10 further comprising determining that said center is not locked, whereby said vehicle is not in four wheel drive, when said ABS is active and said absolute value $|\Delta V_{FIL}(n)|$ is greater than a second threshold $\beta 2$, wherein $\beta 2$ is larger than $\beta 1$.

12. Method as in claim 11 wherein a two wheel drive flag is set when said vehicle is not in four wheel drive and reset when said vehicle is in four wheel drive.

13. Method as in claim 11 wherein it is assumed that said center is locked until it is determined that said center is not locked.

14. Method as in claim 10 further comprising, after determining that said center is locked, determining whether or not four wheel drive axle oscillations are present, said brake pressure control signals being based on whether or not four wheel drive axle oscillations are present.

15. Method for controlling slippage of wheels in a part time four wheel drive vehicle having a lockable center between axles, said method comprising measuring the wheel speeds, adding the wheel speeds at the front and rear axles to produce respective sums, subtracting the sum of the wheel speeds at the rear axle from the sum of the wheel speeds at the front axle to produce an unfiltered difference $\Delta V_{UNF}$, determining whether said vehicle is in two wheel drive or four wheel drive based on $\Delta V_{UNF}$, setting a P flag when $\Delta V_{UNF}$ exceeds a positive threshold P and said vehicle is in four wheel drive and said P flag is not already set, setting an N flag when $\Delta V_{UNF}$ falls below a negative threshold N and said vehicle is in four wheel drive and said N flag is not already set, and $\Delta V_{UNF}$ has not reached or exceeded said threshold P, incrementing a counter at regular time intervals, beginning with the setting of a P flag or an N flag, until said counter reaches a maximum, whereupon said counter is held constant, clearing said counter each time a P flag or an N flag is set, thereby restoring said counter to zero, determining that four wheel drive axle oscillations are present upon setting of a P flag or an N flag when said vehicle is in four wheel drive and said counter is less than said maximum, generating brake pressure control signals based on whether or not four wheel drive axle oscillations are present, and varying brake pressure at each wheel in accordance with said brake pressure control signals.

16. Method as in claim 15 wherein it is determined that four wheel drive axle oscillations are not present when said vehicle is in four wheel drive and said counter reaches said maximum.

17. Method as in claim 15 wherein said counter is held constant when said vehicle is in four wheel drive and neither P flag nor N flag is set and said counter has reached said maximum.

18. Method as in claim 15 wherein said P flag is reset when said vehicle is in four wheel drive and $\Delta V_{UNF}$ falls below said positive threshold P, and said N flag is reset when said vehicle is in four wheel drive and $\Delta V_{UNF}$ exceeds said negative threshold N and has not exceeded said threshold P.

* * * * *